No. 860,352. PATENTED JULY 16, 1907.
C. J. CUNNINGHAM.
ROTARY PLOW.
APPLICATION FILED MAR. 28, 1907.
3 SHEETS—SHEET 1.
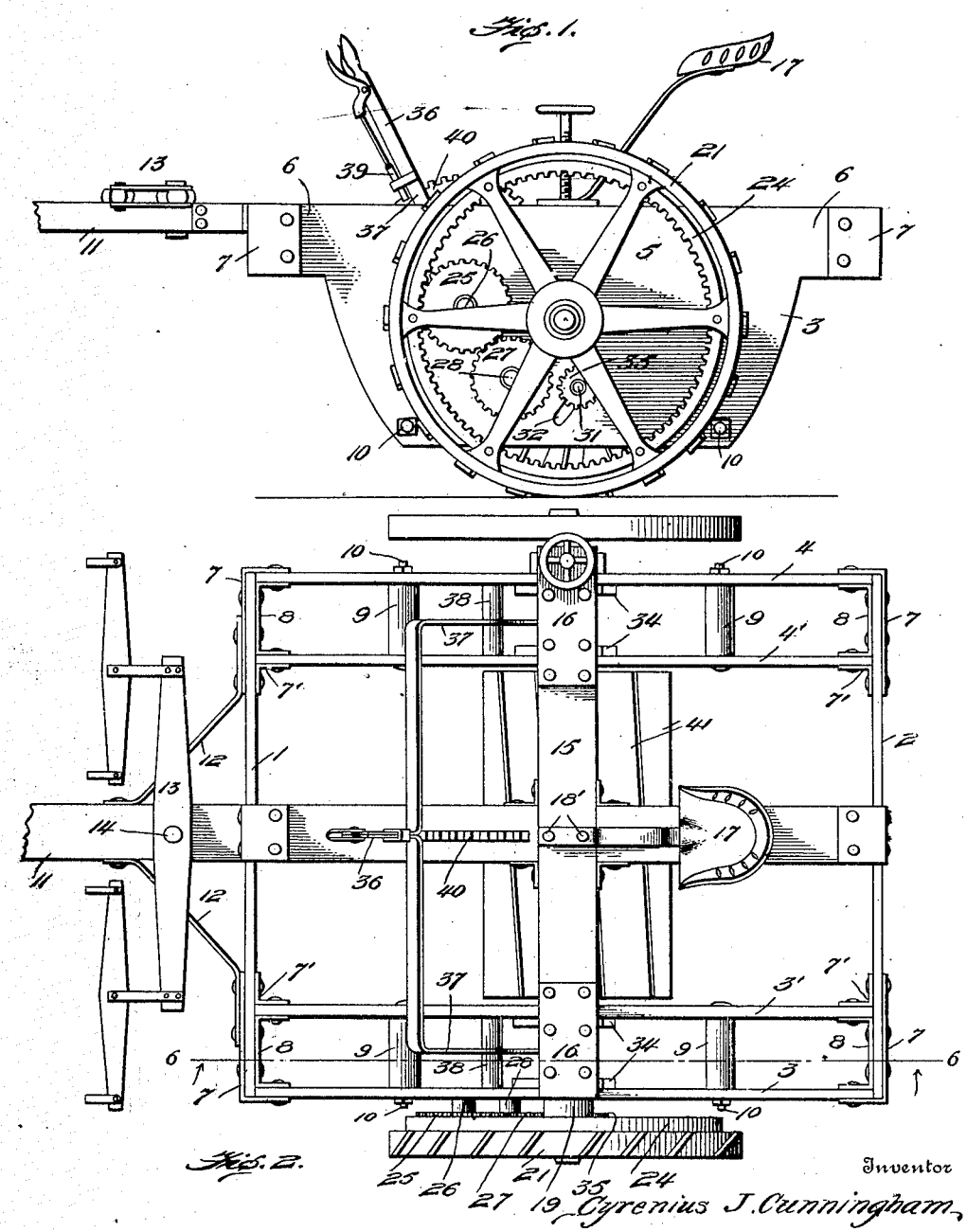
Witnesses
Inventor
Cyrenius J. Cunningham
By E. E. Vrooman, his Attorney.

No. 860,352. PATENTED JULY 16, 1907.
C. J. CUNNINGHAM.
ROTARY PLOW.
APPLICATION FILED MAR. 28, 1907.
3 SHEETS—SHEET 2.
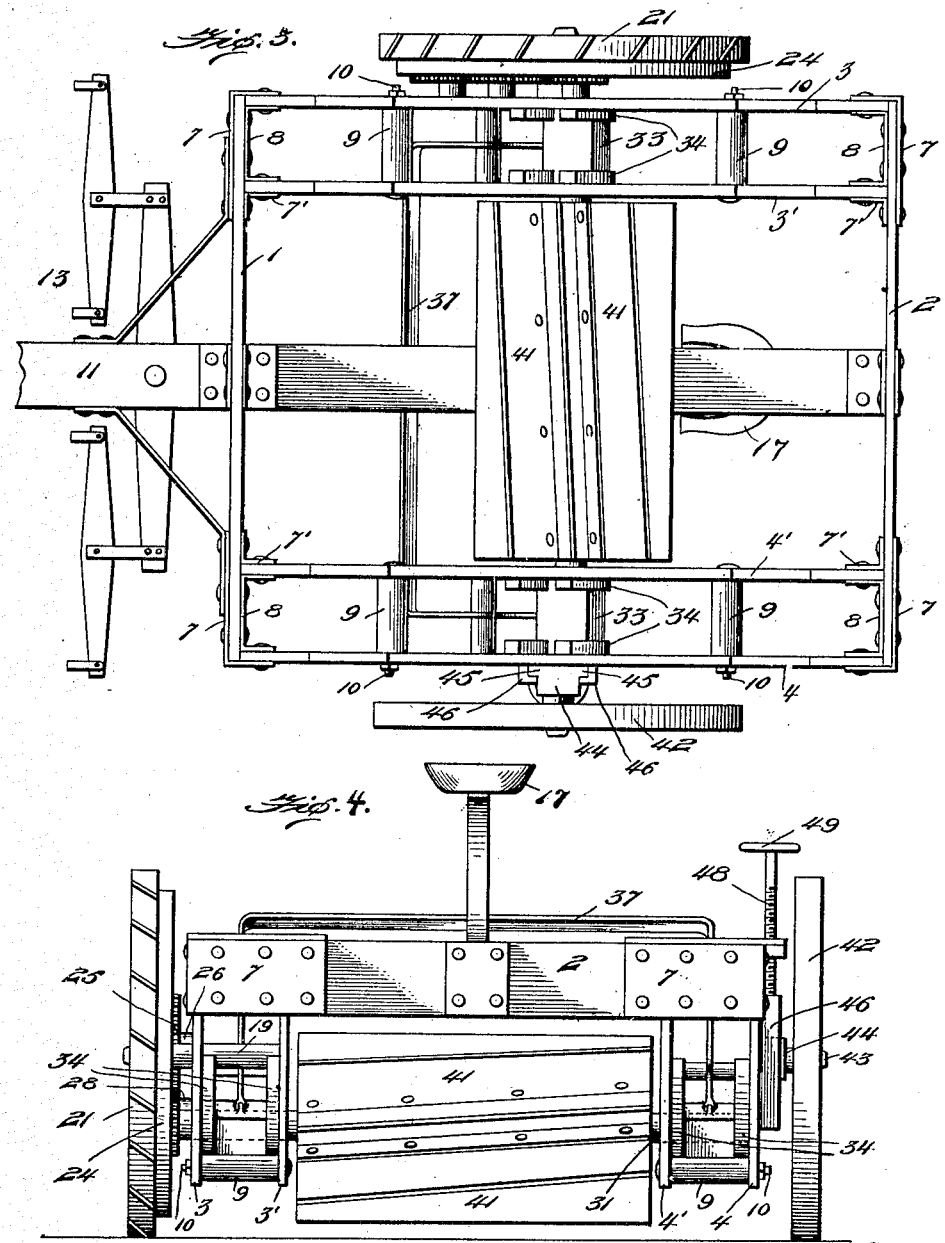

No. 860,352. PATENTED JULY 16, 1907.
C. J. CUNNINGHAM.
ROTARY PLOW.
APPLICATION FILED MAR. 28, 1907.

3 SHEETS—SHEET 3.

Inventor
Cyrenius J. Cunningham

Witnesses
B. M. Offutt
G. M. Spring

By E. E. Vrooman,
his Attorney.

UNITED STATES PATENT OFFICE.

CYRENIUS J. CUNNINGHAM, OF LEWISBURG, TENNESSEE.

ROTARY PLOW.

No. 860,352.　　　　Specification of Letters Patent.　　　　Patented July 16, 1907.

Application filed March 28, 1907. Serial No. 364,974.

*To all whom it may concern:*

Be it known that I, CYRENIUS J. CUNNINGHAM, a citizen of the United States, residing at Lewisburg, in the county of Marshall and State of Tennessee, have invented certain new and useful Improvements in Rotary Plows, of which the following is a specification, reference being had therein to the accompanying drawing.

This invention relates to improvements in rotary plows, and has for its object the provision of means for facilitating the plowing or breaking-up of earth.

Another object of the invention is the improvement of the construction of a wheeled plow, which is provided with a rotatable cutting member or element, and means for driving said rotatable element.

With these and other objects in view, the invention consists of certain novel constructions, combinations, and arrangements of parts as will be hereinafter fully described and claimed.

Figure 5:
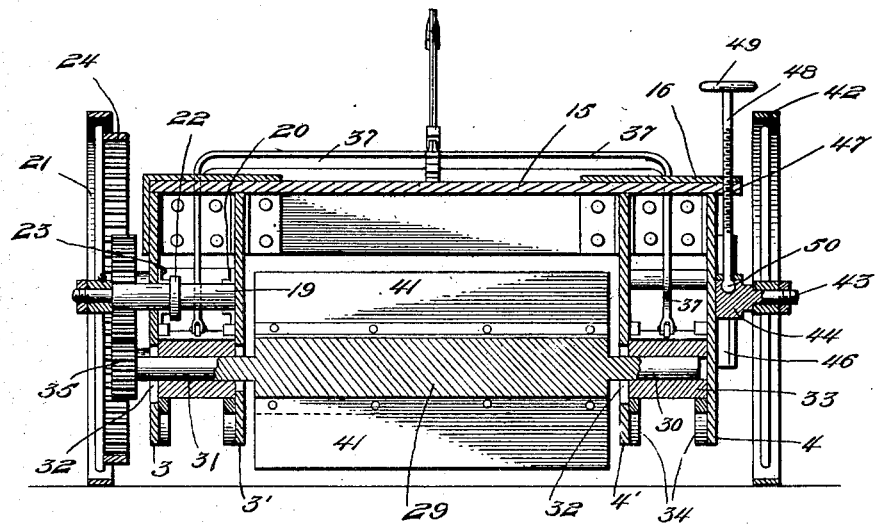
Figure 6:
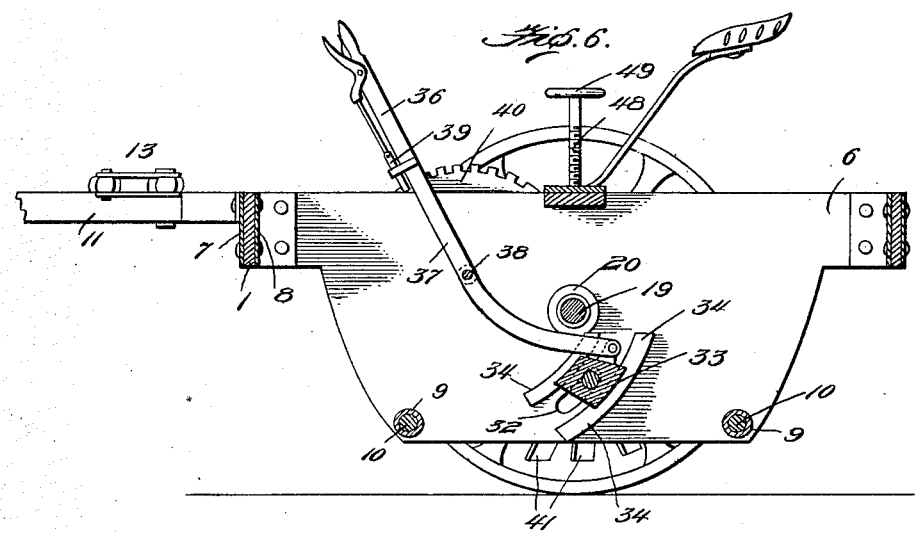

In the drawings: Figure 1 is an elevated side view of a plow constructed in accordance with the present invention. Fig. 2 is a top plan view of the plow or mechanism depicted in Fig. 1. Fig. 3 is an inverted view of the structure depicted in Fig. 2. Fig. 4 is a rear view, in elevation, of my plow. Fig. 5 is a vertical, transverse, sectional view of my plow. Fig. 6 is a longitudinal, sectional view, taken on line 6, 6, Fig. 2, and looking in the direction of the arrow.

Referring to the drawings, the frame of my plow comprises front and end portions 1 and 2, respectively, and the sides of said frame are preferably formed by side portions 3 and 3′ and 4 and 4′. All of these side portions or members are of substantially the same shape, and, therefore, it will only be necessary to describe the specific structure of one. Referring particularly to Fig. 1, the outer side portion 3 is provided with a main body 5 and with extensions 6, 6, at its ends, which extensions 6 project in opposite directions at the upper edge of the side portion. These extensions 6 of the side portions are employed for partly supporting the angle braces 7, 7 and the substantially U-shaped bracing and spacing members 8. The spacing, U-shaped members 8 are preferably positioned between the side portions or members 3 and 3′ and 4 and 4′, as clearly seen in Figs. 2 and 3. Inner, auxiliary angle-braces 7′ are secured to side portions 3′ and 4′ and to the front and rear ends 1 and 2, respectively, of the plow frame. Sleeves 9 are carried by bolts 10, and said sleeves are positioned between and contiguous to the lower edges of side portions 3 and 3′ and 4 and 4′. These sleeves act as spacing means for the side portions of the frame, beside acting in conjunction with the bolts 10 as bracing means for the lower end of the frame and connecting the side portions. It will be noted that these sleeves 9 and bolts 10 are positioned near the lower corners of the side portions.

A draft-beam 11 is preferably positioned near the center and extends longitudinally of the plow frame. Brace-bars or rods 12, 12 are connected, at one end, to the front end 1 of the frame, and at their opposite end, to a draft-beam 11. A doubletree 13 is, preferably, pivotally secured at 13 to the draft-beam 11. A bracing and connecting-beam 15 is secured near the center, and extends transversely of the plow frame, and constitutes a part thereof. This beam 15 is fixedly secured, preferably, to the upper portions of the side portions or members 3 and 3′ and 4 and 4′. Reinforcing, preferably metallic plates 16, 16 are securely fastened to the beam 15 near its ends. An ordinary seat 17 is preferably secured at 18, 18 to beam 15.

A stub-shaft or short shaft 19 is journaled at its inner end in bearing 20 carried by the side portion 3′, see Fig. 5, and the opposite end of said shaft 19 extends through the side portion or member 3, and a drive wheel 21 is journaled upon the extended end of shaft 19. A collar 22 is fixedly secured to shaft 19 between the parallel side portions or members 3 and 3′ and contiguous to and in engagement with a bearing 23 secured to the inner face of side portion 3. This collar 22 prevents any sliding movement of shaft 19 upon side portion 3. Suitably secured to the inner face of the drive wheel 21 is an annular rack or gear 24, the teeth of which are formed upon its inner face. As this annular rack 24 is fixedly secured to the drive-wheel 21, when said drive-wheel is rotated, similar movement will be imparted to said rack or annular gear. A gear or cog 25 meshes with the annular rack 24, and said gear 25 is journaled upon a short shaft 26. The gear 25 also meshes with a gear 27 carried by a shaft 28.

A revoluble shaft 29 is provided with reduced extensions 30 and 31 at its ends. The extension 30 extends through an inclined, elongated slot 32 formed in the side portion 4′, and is journaled in a bearing-block 33. The extension 31 extends through the inclined elongated slots 32 formed upon the side portions or members 3 and 3′, and said extension 31 is journaled in a bearing-block 33. These bearing-blocks 33 are positioned between the side portions 3 and 3′ and 4 and 4′, as is clearly shown in Fig. 5. Each block 33 is capable of sliding vertically between the parallel side portions and work between pairs of curved, inclined guides 34, see Fig. 6. Fixedly secured to the outer end of shaft 31, is a gear or cog 35. A lever 36, provided with a substantially U-shaped or pronged lower end, producing arms 37, 37, is carried by the frame, and said arms 37 are pivotally mounted upon suitable pivots 38, between the side portions or members of the frame. The lower ends of the arms are curved and the extreme ends are pivotally connected, by any suitable means, to the upper portions of the adjustable bearing blocks 33. In the position shown in the drawings, the lever 36 is in its extreme forward position, whereby the shaft 31 is near the upper ends of the elongated slots or ways 32, thereby placing the cog 35 out of engagement with the cog 27, and, consequently, as cogs 27 and 35 do not mesh, the machine is thrown out of gear. By lifting the sliding catch 39 from in engagement with the toothed rack 40, the lever 36 may be swung upon its pivot in the direction of the arrow, Fig. 6, and permit the bearing blocks 33 to move downward upon their guides 34 and allow the cog or gear 35 to mesh with the gear or cog 27. It will be obvious that when the cog 35 meshes with cog 27, and the drive-wheel 21 is rotated, the train of gears will also be rotated, and rotary movement will be imparted to shaft 29. Secured to shaft 29, between side portions or members 3' and 4' are cutting blades 41. Each blade is secured at an angle to the longitudinal axis of the shaft 29, so that the cutting action of the rotary element or cutter will be in the nature of a screw, whereby the movement will tend to facilitate the operation of the cutter and also clean the blades of earth of any foreign substance, during the operation of the machine. By moving the lever 36 forward to the position shown in the drawings, the cog or gear 35 will be lifted from in engagement with cog or gear 27, and the cutting element, comprising the shaft 29 and blades 40, will be, consequently, lifted off of the ground. The guiding brackets 34 and the elongated slots 32 are struck in the arc of a circle with the pivots 18 as the center of said circle, see particularly Fig. 6.

When the machine is in operation, the drive-wheel 21 normally passes over the unplowed ground, whereas the wheel 42 travels over the plowed or cut-up ground. It is desirable to have the wheel 42 vertically-adjustable upon the frame, and to accomplish this, I journal the wheel 42 upon a stub-shaft 43, which shaft 43 is secured to a vertically slidable block 44. The block 44 is provided with flanges 45, 45, formed upon opposite edges, and these flanges 45 slide between angle-guides 46, which guides 46 are secured in a vertical position to the outside of the side portion or member 4.
One end of the reinforcing member 15 is extended, as at 47, Fig. 5, beyond the side portion 4, and this extended end 47, together with the engaging plate 16, is provided with registering screw-threaded apertures, within which is threaded an adjustable shaft 48, provided at its upper end with wheel 59. The lower end 50 of shaft 48 is rotatably connected by a ball and socket joint, to block 44, so that when shaft 48 is rotated, vertical adjustment of block 44 between the brackets or guides 46 will be caused for retaining the entire frame of my plow in a horizontal position, and, consequently, the cutting element will be retained in approximately parallel position with the ground. It is obvious that this adjustment of the block 44, with respect to the frame is desirable, owing to the unevenness of the ground over which the plow may be passing.

What I claim is:

1. In a rotary plow, the combination of a frame, comprising a front and end portion, a plurality of pairs of parallel side portions connected at their ends to said front and end portions, a drive-wheel secured to one pair of side portions, an adjustable supporting-wheel secured to the other pair of side portions, a rotatable cutting element positioned between said pairs of side portions, means connected to said drive-wheel and said cutting element for imparting rotary movement to said cutting element, means positioned between the pairs of side portions and connected between and being capable of bodily lifting said cutting element and placing the same out of gear with said drive-wheel.

2. In a plow, the combination of a frame, comprising front and end portions, a plurality of pairs of side portions, each pair comprising parallel portions or members, angle-braces secured to the outer faces of the front and end portions and the outer side portions, substantially U-shaped spacing and bracing means secured to the front and end portions and positioned between and secured to the members of each pair of side portions, and cutting means carried by said frame.

3. In a plow, the combination of a frame provided with pairs of side portions, each side portion comprising a plurality of members, sleeves positioned between and secured near the lower ends of said members, a rotatable cutting element carried by said frame, and means for driving said element.

4. In a rotary plow, the combination of a frame provided with sides, a plurality of pairs of guides secured to said frame near each side, bearing blocks in engagement with said guides between the pairs of each side, a cutting element journaled in said bearing blocks, lever means connected to said blocks and being capable of lifting said cutting element, and means for rotating said cutting element.

5. In a rotary plow, the combination of a frame provided with side portions, each side portion comprising parallel, spaced members, vertically movable bearing blocks positioned between each pair of members, a rotatable cutting element journaled in said bearing blocks, a lever provided with arms, said arms positioned between the parallel members of the side portions and pivotally mounted thereon, the lower ends of said arms pivotally connected to said bearing blocks, and means for rotating said cutting element.

6. In a rotary plow, the combination of side portions, each side portion comprising a pair of members, a plurality of pairs of curved guides positioned between the members of each pair and secured to the inner faces of said members, bearing blocks slidably mounted between said guides, a shaft journaled in said blocks, a blade secured to said shaft, lever means pivotally mounted between the members of the side portions and pivotally connected to said bearing blocks, and means for driving said shaft and blade.

7. In a rotary plow, the combination with a frame, of vertically adjustable bearing blocks carried by said frame, a shaft provided with reduced ends, said ends journaled in said bearing blocks, a forked lever pivotally mounted upon said frame, means pivotally connecting the lower ends of said lever to said bearing blocks, driving means connected to one of the reduced ends of said shaft for imparting rotary movement thereto, cutting means carried by said shaft, and means for vertically adjusting one side of said frame.

8. In a rotary plow, the combination of a frame, provided near each side with pairs of members, bearing blocks positioned between the members of each pair, lever means pivotally mounted between the members of said pairs and connected to said blocks for vertically adjusting the same, a shaft journaled in said blocks, blades secured to said shaft, and means for rotating said shaft.

9. In a rotary plow, the combination of a frame provided at each end with pairs of parallel members, a shaft extending through one member of one of said pairs and through the members of the other pair, a blade secured to said shaft between the pairs of said members, means rotating said shaft, and means positioned between the members of the pairs and connected to said blocks for adjusting said shafts.

10. In a rotary plow, the combination of a frame provided with pairs of parallel members, the members of one pair provided with registering, elongated apertures or slots, one member of the other pair provided with an elongated aperture or slot formed in the same transverse plane with the elongated apertures of the members of the other pair, a shaft positioned within the elongated apertures of said members, and means for adjusting said shaft positioned between said members of said pairs and connected to the portion of said shaft extending between said members, and means for rotating said shaft.

11. In a rotary plow, the combination with a frame, bearing blocks positioned at opposite portions of said frame, a shaft extending entirely through one of said blocks and partly through the other block, a cog fixedly secured to the extended end of said shaft, means normally meshing with said cog for rotating said shaft, a blade carried by said shaft, and means for moving said blocks for throwing said cog and shaft out of operation.

12. In a rotary plow, the combination with a frame, of a pair of vertically adjustable blocks carried by said frame, a shaft journaled in said blocks, a blade secured to said shaft between said blocks, means engaging one end of said shaft for rotating the same, a forked or bifurcated lever pivotally mounted upon said frame and pivotally connected to said blocks, whereby, when said lever is pivoted, said blocks will be adjusted.

13. In a rotary plow, the combination with a frame, of a horizontal, rotary cutting element positioned centrally of said frame, means for vertically adjusting said cutting element, means for vertically adjusting one side of said frame, and means for imparting rotary movement to said cutting element.

14. In a rotary plow, the combination of a frame provided with ends and sides, each side comprising a pair of parallel members, angle-braces secured against the ends and sides, U-shaped braces secured between the members of each side and secured to the ends, auxiliary angle-brackets secured to the inner members of the sides and to said ends, and cutting means secured to said frame.

15. In a rotary plow, the combination of a frame, a rotary cutting element journaled upon said frame, means for vertically adjusting one side of said frame to a greater height than the opposite side for normally retaining said cutting element and frame in a horizontal position and the cutting element substantially parallel with the ground.

16. In a rotary plow, the combination of a frame, provided near each side with pairs of parallel side members, bearing blocks positioned between the side members of each pair, a forked lever provided with depending arms extending between and journaled upon the side members of the pairs, the lower end of each arm movably connected to a bearing block, and rotary cutting means journaled in said bearing blocks.

17. In a plow, the combination of a frame provided at each side with a pair of vertical, parallel side members, a bearing block slidably mounted between the side members of each pair, guide-plates for each bearing block positioned upon the contiguous faces of the side members in each pair and engaging said bearing block, means pivotally mounted between the side members of each pair and pivotally connected to the bearing blocks and adapted to synchronously move the same, and a rotary cutting element supported by said bearing blocks.

18. In a plow, the combination with a frame provided with a vertical side, a cutting element supported upon said frame, of vertical angle-guides secured against the outer vertical face of said side, a beam carried by said frame and overhanging the outer vertical face of said side, a block slidably mounted between said angle-guides and bearing against the vertical face of said slide, a stub-shaft extending laterally from said block, a wheel journaled upon said shaft, and a shaft threaded into the extended end of said beam and revolubly secured at its lower end to the upper portion of said block.

19. In a plow, the combination with a frame, of a cutting element secured to said frame, said frame provided with a vertical side and with a beam overhanging said side, guides secured against the outer face of said side, a block slidably mounted between said guides and bearing against the vertical face of said side, a shaft secured to said block, a wheel journaled upon said block, said block provided with a socket, a shaft threaded into the extended end of said beam and provided at its lower end with a ball, and means securing said ball within the socket of said block.

20. In a plow, the combination of a frame provided with a pair of vertical side members, pairs of guide-brackets secured upon the contiguous faces of said side members, a bearing block positioned between the contiguous faces of said side members and between the pairs of guide-brackets, lever means carried by said frame and movably connected to said bearing block, and rotary cutting means engaging said bearing block and adapted to be adjusted thereby upon said frame.

21. In a rotary plow, the combination with a frame, of adjustable bearing blocks positioned between the outer sides of said frame, a shaft journaled in said bearing blocks and extending at one end beyond the outer face of one of the outer sides of said frame, blades secured to said shaft between the sides of said frame, means positioned upon the outside of said frame and engaging the extended end of said shaft for rotating the same and the blade, and means for synchronously adjusting said bearing block for lifting said shaft and blades and throwing the same out of operation.

22. In a rotary plow, the combination with a frame, of slidable bearing blocks positioned between the sides of said frame, a rotary cutting element extending only partly through one of said blocks and extending entirely through the other block and beyond one side of said frame, means coöperating with the extended end of said cutting-element for rotating the same, and means for synchronously adjusting the blocks for lifting said cutting element and throwing the same out of operation.

23. In a rotary plow, the combination of a frame provided upon one side with an elongated, curved slot, a rotary cutting element positioned between the sides of said frame and having a portion extending through the slot, a cog fixedly secured to the extended portion of said cutting element outside of said frame, a gear rotatably secured to the outside of said frame, a cog carried by said cutting element and adapted to mesh with said gear, a forked lever pivotally mounted upon said frame, means pivotally connecting the ends of said lever to said cutting element, and means attached to said frame and adapted to impart rotary movement to said gear, whereby, when said cog is meshing therewith, rotary movement may be imparted to said cutting element.

24. In a rotary plow, the combination of a frame provided upon one side with an elongated curved slot, a rotary cutting element positioned between the sides of said frame and having a portion extending through the slot, a cog secured to the extended portion of said cutting element outside of said frame, a gear rotatably secured to the outside of said frame, the cog carried by said cutting element adapted to mesh with said gear, means attached to said frame and adapted to impart rotary movement to said gear, whereby, when said cog is meshing therewith, rotary movement may be imparted to said cutting element, and means for bodily lifting said cutting element for removing said cog from in engagement with said gear.

In testimony whereof I hereunto affix my signature in presence of two witnesses.

CYRENIUS J. CUNNINGHAM.

Witnesses:
R. H. GREENE,
W. A. LONDON.